US008426043B2

(12) United States Patent
Andrews et al.

(10) Patent No.: US 8,426,043 B2
(45) Date of Patent: Apr. 23, 2013

(54) BORON SUBOXIDE COMPOSITE MATERIALS

(76) Inventors: Anthony Andrews, Kensington (ZA); David Stuart McLachlan, Somerset West (ZA); Iakovos Sigalas, Johannesburg (ZA); Mathias Herrmann, Coswig (DE)

(*) Notice: Subject to any disclaimer, the term of this patent is extended or adjusted under 35 U.S.C. 154(b) by 377 days.

(21) Appl. No.: 12/595,998

(22) PCT Filed: Apr. 24, 2008

(86) PCT No.: PCT/IB2008/051592
§ 371 (c)(1),
(2), (4) Date: Aug. 17, 2010

(87) PCT Pub. No.: WO2008/132676
PCT Pub. Date: Nov. 6, 2008

(65) Prior Publication Data
US 2010/0300004 A1 Dec. 2, 2010

(30) Foreign Application Priority Data

Apr. 26, 2007 (ZA) .............................. 2007/03437
Jun. 18, 2007 (GB) .............................. 0711773.2
Feb. 18, 2008 (GB) .............................. 0802949.8

(51) Int. Cl.
| B32B 9/00 | (2006.01) |
| B32B 19/00 | (2006.01) |
| B32B 9/04 | (2006.01) |
| B24D 3/02 | (2006.01) |
| C09C 1/68 | (2006.01) |
| C09K 3/14 | (2006.01) |

(52) U.S. Cl.
USPC ........... 428/702; 428/688; 428/689; 428/699; 428/704; 51/307

(58) Field of Classification Search .................. 51/298, 51/307; 451/540; 428/688, 689, 699, 702, 428/704
See application file for complete search history.

(56) References Cited

U.S. PATENT DOCUMENTS

| 3,660,131 | A | | 5/1972 | Murray et al. |
| 4,500,643 | A | * | 2/1985 | Gesing et al. ................. 501/96.3 |
| 5,330,937 | A | | 7/1994 | Ellison-Hayashi et al. |
| 5,366,526 | A | | 11/1994 | Ellison-Hayashi et al. |
| 5,456,735 | A | | 10/1995 | Ellison-Hayashi et al. |
| 5,518,443 | A | * | 5/1996 | Fisher ............................ 451/540 |
| 5,611,827 | A | * | 3/1997 | Hammarstrom et al. ........ 51/298 |
| 2005/0022457 | A1 | | 2/2005 | Chen et al. |

FOREIGN PATENT DOCUMENTS

| EP | 0 621 327 A | 10/1994 |
| FR | 2 241 495 | * 3/1975 |
| JP | 07-034063 | 2/1995 |
| JP | 09-071468 A | 3/1997 |
| WO | WO 2007/029102 A | 3/2007 |

OTHER PUBLICATIONS

Cao, Minghe et al.: "A simple method to prepare boron suboxide fibres", *J. Electroceram*, 2006,17, pp. 817-820.
International Search Report issued by European Patent Office, dated Feb. 12, 2009, for related international application PCT/IB2008/051584 (published WO 2008/132672 A3).
International Search Report issued by European Patent Office, dated Feb. 19, 2009, for related international application PCT/IB2008/051587 (published WO 2008/132674 A3).
Cao, Minghe et al.: "A simple method to prepare boron suboxide fibres", *J. Electroceram.*, (2006), 17, pp. 817-820.
Karapetyants, M.H. et al.: "General and Inorganic Chemistry", Moscow, Khimia Publishing, 1994 in Russian.
English translation of Russian office action dated Mar. 26, 2012 for corresponding Russian application 2009143565 includes reference to "General and Inorganic Chemistry" by M.H. Karapetyants et al.
Andrews, A. et al.: "Liquid phase assisted hot pressing of boron suboxide-materials", *Journal of the European Ceramic Society*, 28 (2008), pp. 1613-1621.
Anstis, G.R. et al.: "A Critical Evaluation of Indentation Techniques for Measuring Fracture Toughness: I, Direct Crack Measurements", *Journal of the American Ceramic Society*, vol. 64, No. 9, Sep. 1981, pp. 533-538.
He, Duanwei et al.: "Boron suboxide: As hard as cubic boron nitride", *Applied Physics Letters*, vol. 81, No. 4, Jul. 22, 2002, pp. 643-645.
Hubert, Herve et al.: "High-Pressure, High-Temperature Synthesis and Characterization of Boron Suboxide ($B_6O$)", *Chem. Mater.* 1998, 10, pp. 1530-1537.
Itoh, Hideaki et al.: "High Pressure Sintering of $B_6O$ Powder and Properties of Sintered Compact", *J. Soc. Mat. Sci.*, Japan, vol. 47, No. 10, Oct. 1998, pp. 1000-1005. In Japanese, English Abstract.
Itoh, Hideaki et al.: "High Pressure Sintering of $B_6O$ Powder and Properties of Sintered Compact", *J. Soc. Mat. Sci.*, Japan, vol. 47, No. 10, Oct. 1998, pp. 1000-1005. Full English Translation.
Itoh, Hideaki et al.: "High Pressure Sintering Behavior of $B_6O$-Based Composites", *Rev. High Pressure Sci. Technol.*, vol. 7 (1998), pp. 986-988.
Itoh, H. et al.: "Microstructure and mechanical properties of $B_6O$-$B_4C$ sintered composites prepared under high pressure", *Journal of Materials Science*, 35 (2000), pp. 693-698.
Kleebe, H.J. et al.: "$B_6O$: A Correlation Between Mechanical Properties and Microstructure Evolution upon $Al_2O_3$ Addition During Hot Pressing", *J. Am. Ceram. Soc.*, 91 [2], 2008, pp. 569-575.

(Continued)

*Primary Examiner* — Pegah Parvini
(74) *Attorney, Agent, or Firm* — Frommer Lawrence & Haug LLP; Ronald R. Santucci

(57) ABSTRACT

The invention provides a boron suboxide composite material comprising boron suboxide and a secondary phase, wherein the secondary phase contains a boride. The boride may be selected from the borides of transition metals of the fourth to eighth groups of the periodic table. Particularly, the boride may be selected from the borides of iron, cobalt, nickel, titanium, tungsten, hafnium, tantalum, zirconium, rhenium, molybdenum or chromium. The boride also may be a platinum group metal boride, preferably palladium boride. The secondary phase also may contain one or more oxides.

37 Claims, 3 Drawing Sheets

OTHER PUBLICATIONS

Petrak, D.R. et al.: "Mechanical Properties of Hot-Pressed Boron Suboxide and Boron", *Ceramic Bulletin*, vol. 53, No. 8, 1974, pp. 569-573.

Rutz, Heidi L. et al.: "Properties of Yttria-Aluminoborate Glasses", *J. Am. Ceram. Soc.* 73, 6, 1990, pp. 1788-1790.

Sasai, R. et al.: "High pressure consolidation of $B_6O$-diamond mixtures", *Journal of Materials Science*, 36, 2001, pp. 5339-53430.

Shabalala, T.C. et al.: "Hard and Tough Boron Suboxide based Composites", *Advances in Science and Technology*, vol. 45, 2006, pp. 1745-1750.

Itoh, Hideaki et al.: "$B_6O$-$_c$-BN Composites Prepared by High-Pressure Sintering", *J. Am. Ceram. Soc.*, 83 (3) (2000) pp. 501-506.

* cited by examiner

BORON SUBOXIDE COMPOSITE MATERIALS

This application is a 371 of PCT/IB2008/051592 filed on Apr. 24, 2008, published on Nov. 6, 2008 under publication number WO 2008/132676 A2 and claims priority benefits of South African Patent Application No. 2007/03437 filed Apr. 26, 2007, and British Patent Application No. 0711773.2 filed Jun. 18, 2007 and British Patent Application No. 0802949.8 filed Feb. 18, 2008, the disclosures of which are incorporated herein by reference.

BACKGROUND OF THE INVENTION

The invention relates to a boron suboxide composite material.

The development of synthetic ultrahard materials which have hardness values approaching or even exceeding that of diamond has been of great interest to material scientists. With a Vickers hardness of between 70 to 100 GPa, diamond is the hardest material known, followed by cubic boron nitride ($H_V$ ~60 GPa) and boron suboxide herein referred to as $B_6O$. Hardness values of 53 GPa and 45 GPa have been determined at 0.49N and 0.98N load respectively for $B_6O$ single crystals, which are similar to those of cubic boron nitride [9].

It is known that $B_6O$ may also be non-stoichiometric i.e. exist as $B_6O_{1-x}$ (where x is in the range 0 to 0.3). Such non-stoichiometric forms are included in the term $B_6O$. The strong covalent bonds and short interatomic bond length of these materials contribute to the exceptional physical and chemical properties such as great hardness, low mass density, high thermal conductivity, high chemical inertness and excellent wear resistance [1, 2]. In U.S. Pat. No. 5,330,937 to Ellison-Hayashi et al the formation of boron suboxide powders of nominal composition $B_3O$, $B_4O$, $B_6O$, $B_7O$, $B_8O$, $B_{12}O$, $B_{15}O$ and $B_{18}O$ was reported. Potential industrial applications have been discussed by Kurisuchiyan et al (Japan Patent No. 7,034,063) and Ellison-Hayashi et al (U.S. Pat. No. 5,456,735) and include use in grinding wheels, abrasives and cutting tools.

Several techniques have been employed for producing boron suboxide and include such procedures as reacting elemental boron (B) with boron oxide ($B_2O_3$) under suitably high pressure and high temperature conditions [1]. In U.S. Pat. No. 3,660,031 to Holcombe Jr. et al other methods of producing boron suboxides such as reducing boron oxide ($B_2O_3$) with magnesium, or by reducing zinc oxide with elemental boron are mentioned. With each of these known procedures however, there are drawbacks which retard the usefulness of the material in industry. For example, the reduction of $B_2O_3$ with magnesium produces a solid solution of magnesium and magnesium boride contaminants in the suboxide, while the reduction of magnesium oxide with boron produces only a relatively small yield of boron suboxide and is very inefficient. Holcombe Jr. et al (U.S. Pat. No. 3,660,031) produced $B_7O$ by reducing zinc oxide with elemental boron at temperatures of between 1200° C. to 1500'C. A hardness value of 38.2 GPa under 100 g load and density of 2.6 g·cm$^{-3}$ is reported for this material. The fracture toughness for this material is not discussed.

Petrak et al [3] investigated the mechanical and chemical properties of hot-pressed $B_6O$ and reported micro-hardness values as high as 34-38 GPa. Ellison-Hayashi et al (U.S. Pat. No. 5,330,937) produced $B_6O$ with a magnesium addition (approximately 6%) which yielded average $KHN_{100}$ values of 34 GPa to 36 GPa.

Efforts have been made to enhance the mechanical properties of $B_6O$, especially its fracture toughness, by forming $B_6O$ composites with other hard materials such as diamond [4], boron carbide [5], and cBN [6]. The diamond and cBN-containing composites were made under extremely high temperature and pressure conditions. The intention was to form pseudo-binary composite systems, stronger at the grain boundaries than those of pure $B_6O$. Even though high hardness values were recorded for the composites ($H_V$ ~46 GPa), again, fracture toughness values did not exceed 1.8 MPa·m$^{0.5}$. The best value here was obtained with $B_6O$-cBN composites.

Shabalala et al (WO 2007/029102 and [7]) produced $B_6O$ composites with aluminium compounds which resulted in an aluminium borate phase at the grain boundary. A fracture toughness of about 3.5 MPa·m$^{0.5}$ with a corresponding hardness of 29.3 GPa was obtained. The aluminium phases present in the composite are soft and although they may improve the fracture toughness of the resulting composite, they do not contribute to the overall hardness of the composite. Moreover, in addition to a crystalline aluminium borate, a boron oxide rich, chemically unstable amorphous phase and microporosity was formed, further resulting in reduced hardness [10, 11]. The method of producing the composite material involves coating boron suboxide particles with metal and sintering the metal coated particles. The only working example in the specification is to a secondary or binder phase of an aluminium borate.

SUMMARY OF THE INVENTION

According to the present invention, there is provided a boron suboxide composite material comprising boron suboxide and a secondary phase, wherein the secondary phase contains a boride.

For the purpose of this specification, "secondary phase" means everything in the composite material but the boron suboxide, and may be wholly or partially crystalline or amorphous, and may include more than one thermodynamic phase.

Also, any reference to "boride" includes a reference to a monoboride, diboride and any other form of boride.

The boride may be selected from the borides of transition metals of the fourth to eighth groups of the periodic table. Particularly, the boride may be selected from the borides of iron, cobalt, nickel, titanium, tungsten, hafnium, tantalum, zirconium, rhenium, molybdenum or chromium.

The boride also may be a platinum group metal boride, preferably palladium boride.

The amount of boride present in the composite material will vary according to the nature of the boride and the properties of the composite material desired. Generally, for hard borides such as $ZrB_2$, $HfB_2$, $W_2B_5$ (this boride has an area of homogeneity which includes $WB_2$), $Mo_2B_5$, $CrB_2$, $TiB_2$, $ReB_2$, $TaB_2$ and $NbB_2$ the boride will be present in an amount of up to 50 volume percent of the composite material. For softer borides such as borides of nickel, cobalt, iron, manganese, palladium and platinum, the boride will preferably be present in the amount of up to 10 volume percent of the composite material.

The secondary phase also may contain one or more oxides. The oxide may be a rare earth metal oxide and preferably a rare earth metal oxide selected from the oxides of scandium, yttrium, which is preferred, and elements of the lanthanide series, and may be a mixture of rare earth metal oxides. The oxide may also be an oxide of a metal of Group IA, IIA, IIIA or IVA of the periodic table. Examples of preferred oxides of this type are $Al_2O_3$, $SiO_2$, MgO, CaO, BaO or SrO. The secondary phase may contain a mixture of such oxides.

The boron suboxide may be particulate or granular boron suboxide. The mean grain size of the boron suboxide particles or granules themselves is preferably fine and may range from 100 nm to 100 μm, preferably 100 nm to 10 μm.

Finely particulate boron suboxide may be produced, for example, by subjecting a source of boron suboxide to milling. If milling takes place in the presence of an iron or cobalt containing milling medium, some iron and/or cobalt will be introduced into the material which is sintered. For an iron-free material, the milled powder can be washed with hydrochloric acid, or the milling can be carried out with alumina pots and milling balls. It has been found to be advantageous to wash the milled powder in warm water or alcohols to remove any excess of $B_2O_3$ or $H_3BO_3$.

The composite material of the invention comprises boron suboxide, generally in particulate or granular form, and the secondary phase in a bonded, coherent form. The secondary phase will preferably be present in a volume percent less than that of the boron suboxide and will be uniformly dispersed among the boron suboxide. The secondary phase can be amorphous or partially crystalline.

The invention provides a composite material containing boron suboxide and a boride which has both high fracture toughness and high hardness. In particular, the composite material generally has a fracture toughness greater than 3.5 $MPa \cdot m^{0.5}$ in combination with a Vickers Hardness ($H_V$) greater than 25 GPa. Preferably the fracture toughness of the composite material is greater than 3.5 $MPa \cdot m^{0.5}$, and more preferably at least 4.0 $MPa \cdot m^{0.5}$ and still more preferably at least 5.0 $MPa \cdot m^{0.5}$. The fracture toughness ($K_{1c}$), as used herein, was measured at indentations generally with a load of 5 kg. The average of five measured was used to determine the properties of the $B_6O$ samples discussed hereinafter. The $K_{IC}$ was measured via the DCM method, using Anstis' equation [8]:

$$K_c = \delta\left(\frac{E}{H}\right)^{\frac{1}{2}} \frac{P}{c^{\frac{3}{2}}} \quad (1)$$

where E is the Young's modulus, H the hardness and δ is a constant, which only depends on the geometry of the indenter. A value of 470 GPa was used for the Young's modulus value in this equation. For the standard Vickers diamond pyramid indenter, Anstis et al established a value of δ=0.016±0.004 as the calibration constant which was also used for these measurements.

The hardness of the composite material is preferably greater than 25 GPa and more preferably at least 30 GPa. The Vickers hardness was measured using an indentation load of 5 kg. The average of five measured hardness values was used to determine the properties of the $B_6O$ composite samples.

FIG. 1 shows the preferred lower thresholds for the region of hardness and fracture toughness of composite materials of this invention in relation to the prior art boron suboxide materials. It is postulated that the improved toughness of these types of composite could be due to multiple factors such as crack deflection due to the generation of internal stresses, crack arrest mechanisms occurring in the generated secondary phases, and changes in the nature of the composition and properties of the grain boundaries between the $B_6O$ particles. Further, it has been found that the effective densification of the composite material during manufacture is enhanced by the use of a secondary phase which contains a rare earth metal oxide, alone or in combination with another oxide or boride.

Densification in excess of 95 percent of the theoretical densities is possible. In particular, densification of 98%-99% has been obtained. When an oxide is present in the secondary phase, densification can be achieved under milder temperature and pressure conditions.

The addition of an oxide chemically stabilizes the amorphous grain boundary, and makes the composite material more wear resistant. This amorphous grain boundary results from a reaction between the oxide and $B_2O_3$ during the liquid phase of densification. Together they form an oxide liquid, which becomes a glass phase during cooling (i.e. an oxide amorphous grain boundary). To increase wear resistance, chemically stability and high temperature stability of the material, it is preferable that the $B_2O_3$ content in the grain boundary is low. A mol ratio of $B_2O_3/(B_2O_3+$other oxides) of less than 60 is preferable, more preferably a mol ratio of less than 30, and even more preferably a mol ratio of less than 20.

The composite material of the invention may be made by providing a source of boron suboxide particles or granules; contacting the source of boron suboxide with a boride, or compound capable of producing a boride to create a reaction mass; and sintering the reaction mass to produce the boron suboxide composite material. This method forms another aspect of the invention.

Sintering preferably takes place at a relatively low temperature and pressure, i.e. a pressure of less than 200 MPa and a temperature of not exceeding 1950° C. Low pressure sintering processes such as hot pressing (HP), gas pressure sintering, hot isostatic pressing (HIP) or spark plasma sintering (SPS) are preferred. The SPS process is characterised by very fast heating and short isothermal holding times, in particular with heating rates of 50-400 K/minute and isothermal holding times of 5 minutes or less. The hot pressing process is characterised by heating rates of 10-20 K/minute, and isothermal holding times of about 15 to 25, typically 20, minutes.

The boron suboxide may be mixed with the components necessary to produce the secondary phase prior to the sintering step. The boron suboxide may alternatively be coated with the secondary phase components prior to sintering.

The component for the secondary phase may be in the form of a boride when contacted with the boron suboxide and then sintered. Alternatively, the component may be in the form of an oxide or other suitable form which will convert to a boride during the sintering process.

The boron suboxide for the pre-sintered reaction mass will generally be in particulate or granular form and preferably have a mean grain size in the range 100 nm to 20 microns and more preferably a mean grain size in the range 100 nm to 10 microns.

The composite material according to the invention may be used in cutting applications and in wear parts. It may also be crushed to grit form and used in grit applications. Moreover, the composite material may be used in armour applications, such as ballistic armour, and particularly body armour.

DESCRIPTION OF EMBODIMENTS OF THE INVENTION

Figure 1:
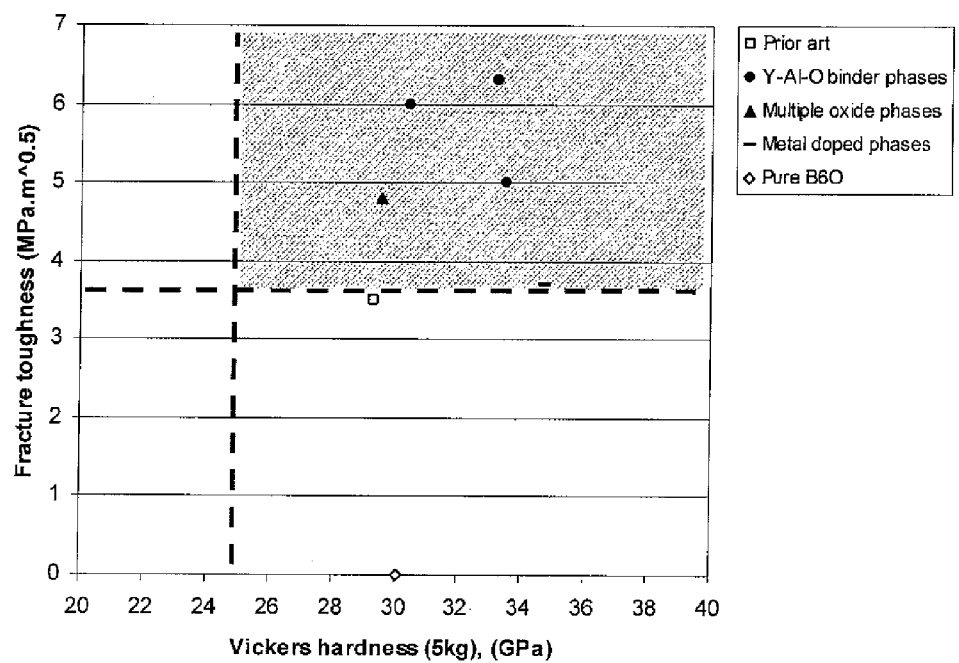
FIG. 1 is a graph showing the relative hardness and fracture toughness values for $B_6O$ composite materials of this invention; and similar types of materials from the prior art.
Figure 2:
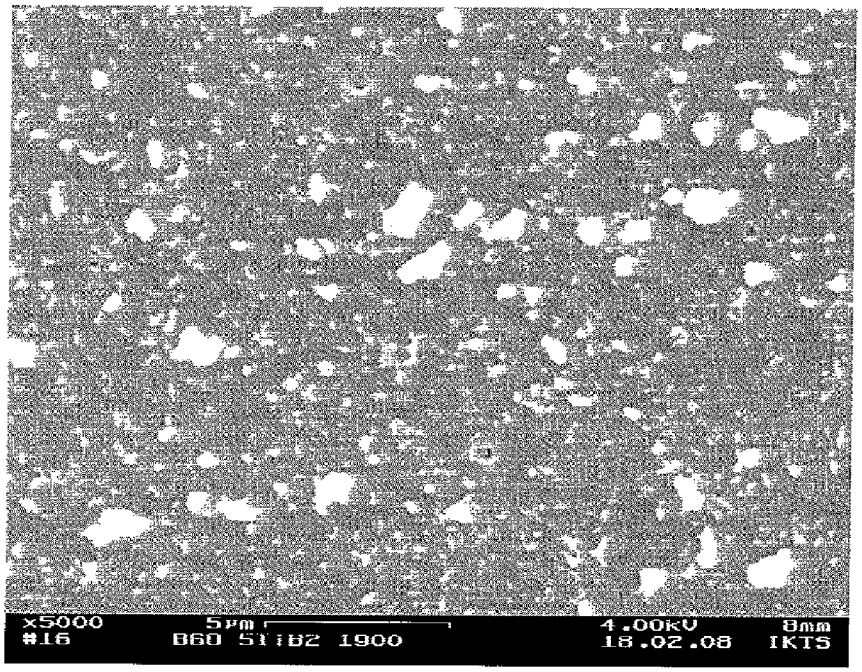
FIG. 2 is a SEM image of a sintered composite material produced from $B_6O$ admixed with 10% by weight of $TiB_2$, 2.0% by weight of $Al_2O_3$ and 2.0% by weight of $Y_2O_3$ (example 5).

The invention will now be illustrated by the following examples. Table 1 summarises these materials and their measured hardness and toughness properties for comparative purposes. In these examples the terms "secondary phase" and "grain boundary phase" are both used. The terms are used interchangeably and refer to the same phase.

For the purpose of this specification, "secondary phase" means everything in the composite material but the boron suboxide, and may be wholly or partially crystalline or amorphous, and may include more than one thermodynamic phase.

EXAMPLE 1

$B_6O$ starting powder was milled using a jet mill. The average particle size after milling was 2.3 µm. The milled $B_6O$ powder was admixed with 2% by weight of $Al_2O_3$ (including the wear of the alumina balls), 2% by weight of $Y_2O_3$, 2% by weight of $ZrO_2$ (i.e. TZP stabilised with 3 mol yttria), and 0.53% by weight of MgO in isopropanol and milled for six hours using an attrition mill with $Al_2O_3$ balls. A second sample was prepared without the $Y_2O_3$ addition. The milled mixture was dried using a rotary evaporator and then placed in a graphite die coated with hexagonal BN, and sintered using the SPS method with a heating rate of 50 K/minute and a holding time of 5 minutes, under an argon atmosphere.

A fully densified composite material comprising boron suboxide particles was produced within which a secondary phase was uniformly dispersed. In the sample containing $Y_2O_3$, the borides $ZrB_2$ and $ZrB_{12}$ were formed, together with an amorphous grain boundary. In the sample without the $Y_2O_3$ addition, an additional crystalline phase was detected by XRD containing $Al_{18}B_4O_{33}$. The MgO together with the remaining $B_2O_3$ and some $Al_2O_3$ formed an amorphous grain boundary phase. This amorphous grain boundary phase is more stable than that formed with only $Al_2O_3$ (Shabalala). The typical feature of formation of micropores was not observed, resulting in higher hardness values. The $ZrO_2$ transforms into $ZrB_2$ and partially $ZrB_{12}$. It has to be mentioned that the peaks of $ZrB_{12}$ are slightly shifted in comparison to the standard values, indicating that there may be some yttrium or aluminum dissolved in the lattice.

A cross-section of the sample was polished and then tested for hardness and fracture toughness with Vickers indenter. The hardness was found to be about 36.9 GPa at a load of 0.4 kg and a fracture toughness of about 4 $MPa \cdot m^{0.5}$.

EXAMPLES 2-4

Boron suboxide composite materials were produced using the same conditions set out in Example 7, but replacing the $ZrO_2$ with $HfO_2$, $WO_3$ and $TiB_2$ respectively in the ratios provided in Table 1. Densification was carried out at 1850° C. and 1900° C. At 1850° C. densities of 96-98% were observed. At 1900° C. densities of more than 98% were observed. In example 8, the same densities were observed for both temperatures, indicating slightly better densification behaviour with $ZrO_2$ additions than what is achieved with the addition of $HfO_2$ or $WO_3$.

In the samples, some $Al_{18}B_4O_{33}$ and a boride was also formed. There was no formation of microporosity as in Shabalala et al (WO 2007/029102 and [9]) indicating a more stable grain boundary phase. In addition to the oxide phase, borides ($HfB_2$, $W_2B_5$, which is a composition with a homogeneity range and sometimes is named also as $WB_2$-$W_2B_5$ and $WB_2$ are both used because a detailed determination of the lattice constants was not carried out) were also formed in all the examples.

EXAMPLES 5-7

Boron suboxide composite materials were produced using the same conditions set out in Example 1, but admixing the milled powder with 10% $TiB_2$, in example 5 or 5% $TiH_2$ and 2% $Al_2O_3$ (including the wear of the alumina balls during milling) in example 6. The composite in example 7 was produced by direct reaction sintering starting with B and $TiO_2$.

The materials, densities, phase compositions and properties are given in Table 1. The data showed that the addition of $Y_2O_3$/$Al_2O_3$ increases densification substantially. The densification at 1850° C. can be completed for the compositions with the additives, whereas the pure $B_6O$ powders can only be densified to 95% of theoretical densities at this temperature. The same density as for the pure material can be reached at 50-100° C. lower temperatures. Fast densification starts at 1350-1370° C. for the material with the $Y_2O_3$/$Al_2O_3$ additives whereas the densification of the pure material starts only at 1450° C. The microstructures of the materials with addition of $Y_2O_3$/$Al_2O_3$ reveal the existence of such a liquid, because no crystalline grain boundary phases (secondary phase) are found. SEM figures show a homogeneous distribution of the $Y_2O_3$/$Al_2O_3$ additives in the triple junctions. The grain size of the material cannot be determined, but from the SEM micrographs it can be concluded that the grain size is less than 1 µm, i.e. no grain growth occurs.

The addition of 10 wt % $TiB_2$ to the composition of the $B_6O$+$Y_2O_3$/$Al_2O_3$ does not change the densification behaviour.

Figure 3:
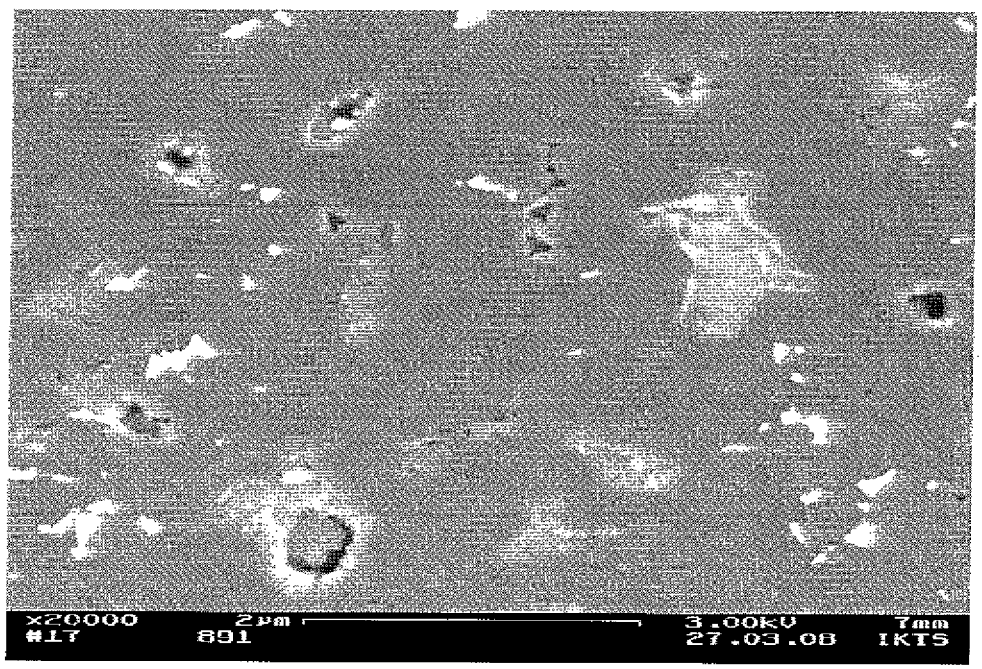
FIG. 3 is a SEM image of a sintered composite material produced from $B_6O$ admixed with 4% by weight of $WO_3$, 2.0% by weight of $Al_2O_3$, and showing the sub-µm $W_2B_5$ precipitates (white phase) and the partially polished out oxide grain boundary (example 4).

FIG. 3 shows the microstructure of the material of example 10, showing that the $TiB_2$ particle is in the range of 1-2 µm and the oxide grain boundary is visible.

Figure 4:
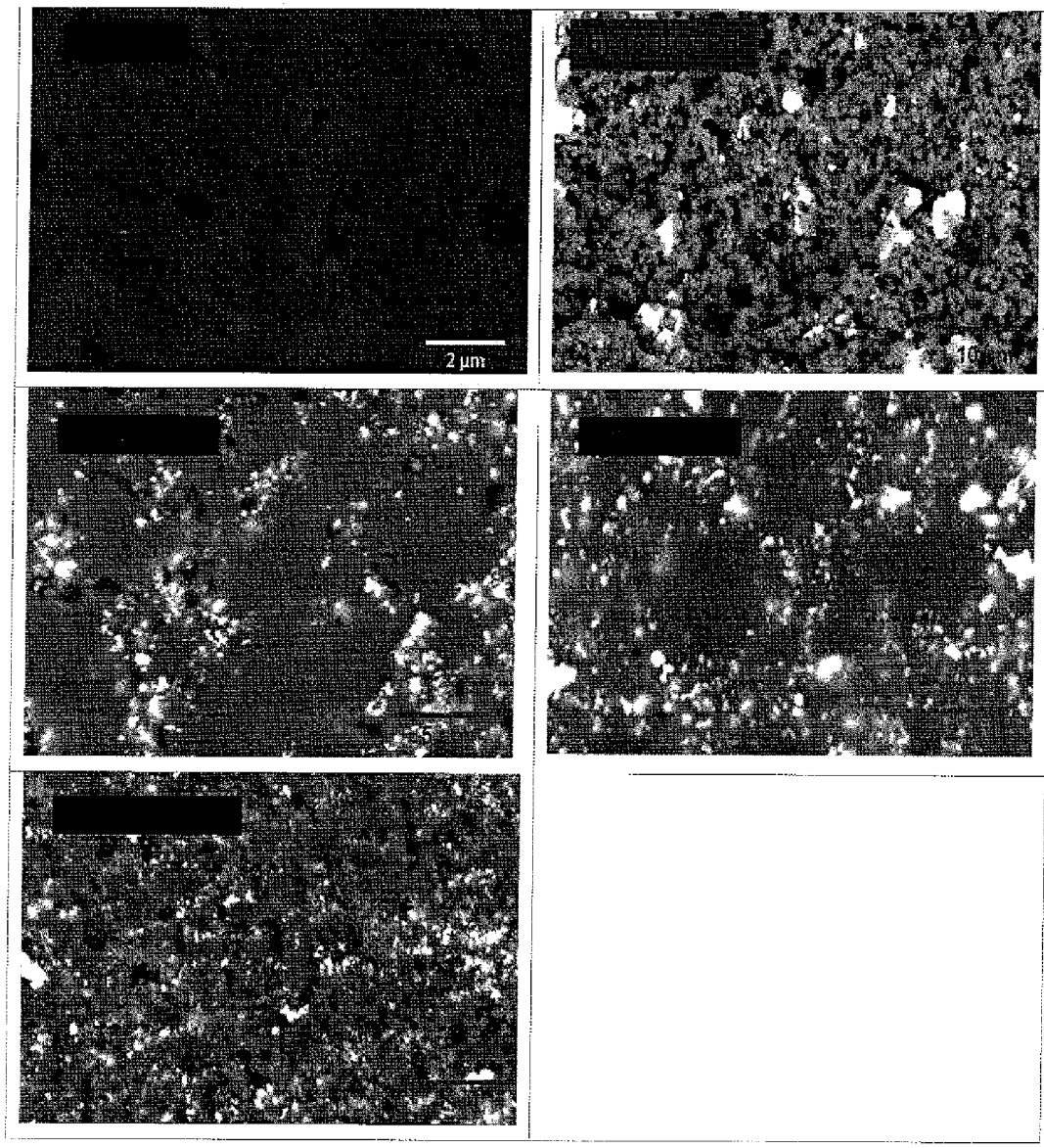
FIG. 4 comprises of 5 SEM images of pure $B_6O$ and doped $B_6O$ hot pressed samples (white phases are $Pd_2B$ and grey phases are $B_6O$; dark spots are residual pores).

The microstructure of the material with $WO_3$ (example 9) additions are given in FIG. 4. The material is nearly 100% dense and the formation of borides is visible. The particle size of the precipitated borides is less than 1 µm.

The results show the possibility of producing dense superhard $B_6O$ materials without high pressure. The improved densification of these materials in comparison to pure $B_6O$ is connected with the formation of a liquid phase during densification.

EXAMPLES 8-11

$B_6O$ powder was synthesized from boric acid and amorphous boron powder, according to a method reported in literature. The mean particle size of the synthesized powder was 1-2 µm. $PdCl_2$ was used as the source to precipitate Pd on the $B_6O$ powder. $PdCl_2$ (weight representing 2 and 5 volume % Pd) was dissolved in 1 M HCl and $B_6O$ powder was added. The mixture was stirred and dried using a rotary evaporator. The dried $Pd/B_6O$ powders were put in an alumina boat and placed in a tube furnace. The furnace was heated up to 400° C. for 1 hour to decompose the $PdCl_2$ to Pd. The furnace was cooled to room temperature.

A uniaxial hot press was used for all the hot pressing experiments. Hot pressing was done in argon atmosphere. An hBN piston and a graphite die with an hBN insert were used for the hot pressing. Samples with a diameter of 18 mm and a height of 3-4 mm were produced. The $Pd/B_6O$ powders were hot pressed at temperatures up to 1900° C. and a pressure of 50 MPa. The composition and the compaction parameters of the samples are given in Table 1. FIG. 4 comprises of 5 SEM images of pure $B_6O$ and doped $B_6O$ hot pressed samples.

The $B_6O$ doped with 5 volume % Pd was first hot pressed at 1600° C. under a pressure of 50 MPa for 30 minutes. This sample ($16B_6O_5Pd$) had an open porosity of 26.7% and a density of 1.75 g/cm³. The high porosity was evident in a SEM image. Due to the very low density, the mechanical properties were not measured. Density obtained for the sample hot pressed at 1900° C. ($19B_6O_5Pd$) reached the theoretical density. Grain growth was also observed.

Phase analysis showed mainly $Pd_2B$ as the grain boundary phase (secondary phase). The same boride phase was observed in all other $Pd/B_6O$ hot pressed samples. A hardness of 22.5 GPa was recorded for the $Pd/B_6O$ hot pressed sample at 1900° C., which is much lower than the hardness of pure $B_6O$. However, very high fracture toughness was obtained (13.5 MPa·m$^{0.5}$).

Due to the increased grain growth, the sintering temperature with 2 volume % Pd was reduced. Sintering at 1750° C. for 20 minutes also did not yield a fully dense sample, but better than the sample with 5 volume % Pd sintered at 1600° C. (see Table 1). The high porosity (7.3%) was evident in the SEM image. Hot pressing at 1800° C. resulted in a nearly completely densified material. A hardness, $Hv_5$ of 28 GPa and fracture toughness 5.1 MPa·m$^{0.5}$ was recorded for this sample. These values were higher than the values obtained for the sample $175B_6O2Pd$ sintered at 1750° C.

The densities of the materials showed that densification takes place in the temperature range between 1750° C. and 1900° C. Both samples densified at 1750° C. and 1900° C. showed some residual porosity. During densification, $Pd_2B$ was formed even at sintering temperatures as low as 1600° C. This proves that Pd reacts with $B_6O$ forming a boron containing liquid phase (melting point of $Pd_2B$ is 994° C.). Nevertheless, densification takes place only at temperatures higher than 1600-1700° C. SEM images of the samples indicated that the reason could be some insufficient wetting, at least at low temperatures. The strong grain growth at hot pressing temperatures (1800-1900° C.) suggests that at least at higher temperatures a solubility of the $B_6O$ exists in the liquid formed, which assists the sintering because it reduces the temperature at which dense samples could be prepared by about 100° C. The liquid formed recrystallised during cooling forming $Pd_2B$ at the grain boundaries as seen in the XRD patterns.

The hardness value recorded for the $19B_6O_5Pd$ sample was lower than that of the $18B_6O_2Pd$ sample. Decreasing the amount of $Pd_2B$ and reducing the sintering temperature improved the hardness (Table 1). It is also important to note that hardness measurement could be done using 5 kg load. Values reported for $B_6O$ composites in the literature have been carried out using a maximum of 200 g load, except for Shabalala who reported hardness values using 0.5 kg and 5 kg loads.

Fracture toughness obtained for $19B_6O5Pd$ was very high (13.5 MPa·m$^{0.5}$). Nevertheless, the hardness dropped to 22 GPa. A reduction of the Pd content strongly increases hardness, but also reduces the fracture toughness.

EXAMPLES 12-22

$B_6O$ powder was synthesized from boric acid and amorphous boron powder, according to a method reported in literature [7]. The mean particle size of the synthesized powder was 1-2 μm. The $B_6O$ powder was milled in an attritor mill using steel balls until a mean particle size of 500 nm was attained. The contamination from the steel balls was removed by washing with HCl. Subsequently the additives of Fe and Cr, Fe, FeO, FeB, Ni, NiO, NiB, Cr, $CrO_3$, $CrB_2$, and Co were added to the proportions indicated in Table 1. A uniaxial hot press was used for all the hot pressing experiments. Hot pressing was done in argon atmosphere. Samples with a diameter of 18 mm and a height of 3-4 mm were produced. The mixtures were sintered under the conditions indicated in Table 1. It was possible to attain high densities at 1850° C.

The results show the possibility of producing dense superhard $B_6O$ materials without high pressure. The phases present in the resulting ceramic, as well as the properties measured is given in Table 1. The second phases were evenly distributed within the $B_6O$ matrix. Grain sizes varied from 1 to 5 micrometers. No crystalline phases other than $B_6O$ were detected in example 12 (this is probably caused by the concentration below the detection limit). Fe, Co, Ni and Pd additions formed a boride in the secondary phase, regardless of the starting composition (i.e. oxide, metal or boride). These borides are liquid under sintering conditions, and this metallic liquid accelerates densification behaviour. During cooling, borides crystallize from the melt. These borides are not as hard as $TiB_2$ and it is therefore preferred that the amount of these additions is minimal, preferably in the range of 1 or 2 volume %. If additionally stable oxides are present in the composition, such oxides formed a separate oxide melt, which may positively contribute toward toughening and densification.

TABLE 1

| No. | Material components (sintering temp, ° C.) | Additive Ratio (weight %) | $H_V$(5 kg), (GPa) | $K_{IC}$, (MPa·m$^{0.5}$) | Phases (after sintering) | Density (g/cm³) |
|---|---|---|---|---|---|---|
| Ref* | $B_6O$ | — | 30.1 (1 kg Load) | Brittle | $B_6O$ | 2.5 |
| Prior art* | $B_6O + Al_2O_3$ | — | 29.3 | 3.5 | $B_6O$ $Al_4B_2O_9$ | |
| Ex 1a | $B_6O + Al_2O_3 + Y_2O_3 + ZrO_2 + MgO$ (1850° C.) | 2:2:2:0.53 | 34.2 ± 0.6** | 4 | $B_6O$, $ZrB_2$, $ZrB_{12}$ amorphous secondary phase | 2.60 |

TABLE 1-continued

| No. | Material components (sintering temp, ° C.) | Additive Ratio (weight %) | $H_V$(5 kg) (GPa) | $K_{IC}$, (MPa·m$^{0.5}$) | Phases (after sintering) | Density (g/cm$^3$) |
|---|---|---|---|---|---|---|
| Ex 2 | $B_6O + Al_2O_3 + ZrO_2 + MgO$ (1850° C.) | 2:2:0.53 | 36.9 ± 0.6** | 4 | $B_6O$, $ZrB_2$ $ZrB_{12}$, $Al_{18}B_4O_{33}$ amorphous secondary phase | 2.59 |
| Ex 3a | $B_6O + Al_2O_3 + Y_2O_3 + HfO_2 + MgO$ (1900° C.) | 2:2:2:0.53 | 34.2 ± 0.5** | 4 | $B_6O$, $HfB_2$ amorphous secondary phase | 2.52 |
| Ex 3b | $B_6O + Al_2O_3 + HfO_2 + MgO$ (1850° C.) | 2:2:2:0.53 | 36.1 ± 0.6** | 4 | $B_6O$, $HfB_2$ $Al_{18}B_4O_{33}$ amorphous secondary phase | 2.56 |
| Ex 4a | $B_6O + Al_2O_3 + Y_2O_3 + WO_3 + MgO$ (1900° C.) | 2:2:4:0.53 | 35.6 ± 0.4** | 4 | $B_6O$, $W_2B_5$ amorphous secondary phase | 2.61 |
| Ex 4b | $B_6O + Al_2O_3 + Y_2O_3 + WO_3 + MgO$ (1850° C.) | 2:2:4:0.53 | 34.0 ± 0.5** | 4 | $B_6O$, $W_2B_2$ amorphous secondary phase | 2.61 |
| Ex 4c | $B_6O + Al_2O_3 + WO_3 + MgO$ (1850° C.) | 2:4:0.53 | 34.2 ± 0.6** | 4 | $B_6O$, $W_2B_2$ amorphous secondary phase | 2.61 |
| Ex 5 | $B_6O + Al_2O_3 + Y_2O_3 + TiB_2 + MgO$ (1900° C.) | 2:2:10:0.53 | 36.8 ± 0.5** | 4 | $B_6O$, $TiB_2$, amorphous secondary phase | 2.68 |
| Ex 6a | $B_6O + Al_2O_3 + Y_2O_3 + TiH_2 + MgO$ (1900° C.) | 2:2:5:0.53 | 36.1 ± 0.6** | 4 | $B_6O$, $TiB_2$ amorphous secondary phase | 2.49 |
| Ex 6b | $B_6O + Al_2O_3 + TiH_2 + MgO$ (1850° C.) | 2:5:0.53 | 33.6 ± 0.6** | 4 | $B_6O$, $TiB_2$ amorphous secondary phase | 2.51 |
| Ex 7 | $B + TiO_2 + MgO + Al_2O_3$ (wear of balls) (1850° C.) | 65.44:34.55:0.4:0.5 | 28.2 ± 0.6** | 4 | $B_6O$, $TiB_2$, amorphous secondary phase | 2.79 |
| Ex 8 | $B_6O + Pd$ (1600° C., 30 min) | 16:5 | — | — | $B_6O$, $PdB_2$ | 1.75 |
| Ex 9 | $B_6O + Pd$ (1900° C., 30 min) | 19:5 | 22.5 ± 0.9 | 13.5 ± 3.2 | $B_6O$, $PdB_2$ | 2.82 |
| Ex 10 | $B_6O + Pd$ (1800° C., 20 min) | 18:2 | 28.0 ± 1.2 | 5.1 ± 0.8 | $B_6O$, $PdB_2$ | 2.61 |
| Ex 11 | $B_6O + Pd$ (1750° C., 20 min) | 175:2 | 25.0 ± 1.1 | 3.9 ± 0.2 | $B_6O$, $PdB_2$ | 2.41 |
| Ex 12 | Pure $B_6O$ + Fe, Cr (1900° C.) | 1:1.2 | 34.7 ± 1.1 | 3.7 ± 0.10 | $B_6O$ | 2.48 |
| Ex 13 | $B_6O$ + Fe (1850° C. 50 MPa) | 1.17 | 27.4 | 3.3 | $B_6O$, FeB | 2.53 |
| Ex 14 | $B_6O$ + FeO (1850° C. 50 MPa) | 1.5 | 28.3 | 3.1 | $B_6O$, FeB | 2.51 |
| Ex 15 | $B_6O$ + FeB (1850° C. 50 MPa) | 1.4 | 27.2 | 7.6 | $B_6O$, FeB | 2.56 |
| Ex 16 | $B_6O$ + Cr (1850° C. 50 Mpa) | 1.07 | 29.4 | 5.5 | $B_6O$, $CrB_2$ | 2.57 |
| Ex 17 | $B_6O + CrB_2$ (1850° C. 50 MPa) | 1.7 | 32.0 | 4.5 | $B_6O$, $CrB_2$ | 2.51 |
| Ex 18 | $B_6O$ + Co (1850° C. 80 MPa) | 1.33 | 33.9 | 5.3 | $B_6O$, CoB | 2.49 |
| Ex 19 | $B_6O + CrO_3$ (1850° C. 50 MPa) | 1.4 | 30.4 | 4.8 | $B_6O$, $CrB_2$ | 2.53 |
| Ex 20 | $B_6O$ + Ni (1850° C. 80 MPa) | 3.7 | 30.6 | 6.4 | $B_6O$, NiB | 2.53 |
| Ex 21 | $B_6O$ + NiB (1850° C. 80 MPa) | 1.5 | 31.8 | 6.5 | $B_6O$, NiB | 2.57 |
| Ex 22 | $B_6O$ + NiO (1850° C. 80 MPa) | 2.8 | 27.1 | 6.1 | $B_6O$, NiB | 2.54 |

*Data for reference and prior art sample taken from Shabalala et al. (WO2007/029102)
**Measured with 0.4 Kg load References
1. H. Hubert, L. Garvie, B. Devouard, P. Buseck, W. Petuskey, McMillan, Chem. Mater.; 10; (1998); pp. 1530-1537
2. H. Itoh, I. Maekawa, H. Iwahara, J. Soc. Mat. Sci., Japan; 47(10); (1998); pp. 1000-1005
3. R. R Petrak, R. Ruh, G. R. Atkins, Cer. Bull.; 53(8); (1974); pp. 569-573
4. R. Sasai, H. Fukatsu, T. Kojima, and H. Itoh, J. Mater. Sci.; 36; (2001); pp. 5339-5343
5. H. Itoh, I. Maekawa, and H. Iwahara; J. Mater. Sci.; 35; (2000); pp. 693-698
6. H. Itoh, R. Yamamoto, and H. Iwahara; J. Am. Ceram. Soc.; 83(3); (2000); pp. 501-506
7. T. C. Shabalala, D. S. Mclachlan, I. J. Sigalas, M. Herrmann; Advances in Sci and Tech.; 45; (2006); pp. 1745-1750
8. G. Anstis, P. Chantikul, B. Lawn and D. Marshall; "A critical evaluation indentation techniques for measuring fracture toughness: I, Direct crack measurements", J. Am. Ceram. Soc.; 64; (1981); pp 533-538
9. He, D., Zhao, Y., Daemen, L., Qian, J., Shen, T. D. & Zerda, T. W. Boron suboxide: As hard as cubic boron nitride, *Appl. Phys. Lett.* Vol. 81, 4, 643-645 (2002)
10. A. Andrews, M. Herrmann, T. C. Shabalala, and I. Sigalas, "Liquid phase assisted hot pressing of boron suboxide materials", *J. Europ. Ceram. Soc.* 28, 1613-1621 (2008)
11. H.-J. Kleebe, S. Lauterbach, T. C. Shabalala, M. Herrmann and I. J. Sigalas, "$B_6O$: A Correlation Between Mechanical Properties and Microstructure Evolution Upon $Al_2O_3$ Addition During Hot-Pressing", *J. Amer. Ceram. Soc.,* 91 [2] 569-575 (2008))
12. Rutz H. L., Day D. E. and Spencer C. F., J. Am. Ceram. Soc., 1990, vol. 73, No. 6, p. 1788.

The invention claimed is:

1. A boron suboxide composite material comprising boron suboxide and a secondary phase, the secondary phase containing a boride selected from ZrB2, HfB2, W2B5, Mo2B5, CrB2, TiB2, ReB2, TaB2 and NbB2, and wherein the boride is present in an amount up to 50 volume % of the composite material.

2. A composite material according to claim 1 wherein the secondary phase also contains one or more oxides.

3. A composite material according to claim 2 wherein the oxide is a rare earth metal oxide.

4. A composite material according to claim 3 wherein the rare earth metal oxide is selected from the oxides of scandium, yttrium and elements of the lanthanide series.

5. A composite material according to claim 4 wherein the rare earth metal oxide is yttrium oxide.

6. A composite material according to claim 2 wherein the oxide is an oxide of an element of the Groups IA, IIA, IIIA, and IVA of the periodic table.

7. A composite material according to claim 6 wherein the other oxide is selected from Al2O3, SiO2, MgO, CaO, BaO and SrO.

8. A composite material according to claim 2 wherein the secondary phase contains a mixture of oxides.

9. A composite material according to claim 1 wherein the boron suboxide is particulate or granular boron suboxide.

10. A composite material according to claim 1 wherein the mean grain size of the boron suboxide particles or granules range from 100 nm to 100 μm.

11. A composite material according to claim 10 wherein the mean grain size of the boron suboxide particles or granules range from 100 nm to 10 μm.

12. A composite material according to claim 1 wherein the fracture toughness of the composite material is greater than 3.5 MPa·m0.5.

13. A composite material according to claim 1 wherein the hardness of the composite material is greater than 25 GPa.

14. A boron suboxide composite material comprising boron suboxide and a secondary phase, the secondary phase containing a boride selected from borides of nickel, cobalt, iron, manganese, palladium and platinum and wherein the boride is present in an amount of up to 10 volume percent of the composite material.

15. A composite material according to claim 14 wherein the secondary phase also contains one or more oxides.

16. A composite material according to claim 15 wherein the oxide is a rare earth metal oxide.

17. A composite material according to claim 16 wherein the rare earth metal oxide is selected from the oxides of scandium, yttrium and elements of the lanthanide series.

18. A composite material according to claim 17 wherein the rare earth metal oxide is yttrium oxide.

19. A composite material according to claim 15 wherein the oxide is an oxide of an element of the Groups IA, IIA, IIIA, and IVA of the periodic table.

20. A composite material according to claim 19 wherein the other oxide is selected from Al2O3, SiO2, MgO, CaO, BaO and SrO.

21. A composite material according to claim 15 wherein the secondary phase contains a mixture of oxides.

22. A composite material according to claim 14 wherein the boron suboxide is particulate or granular boron suboxide.

23. A composite material according to claim 14 wherein the mean grain size of the boron suboxide particles or granules range from 100 nm to 100 μm.

24. A composite material according to claim 23 wherein the mean grain size of the boron suboxide particles or granules range from 100 nm to 10 μm.

25. A composite material according to claim 14 wherein the fracture toughness of the composite material is greater than 3.5 MPa·m0.5.

26. A composite material according to claim 14 wherein the hardness of the composite material is greater than 25 GPa.

27. A boron suboxide composite material comprising boron suboxide and a secondary phase, the secondary phase containing a boride and one or more oxides wherein at least one of the oxides is a rare earth metal oxide.

28. A composite material according to claim 27 wherein the rare earth metal oxide is selected from the oxides of scandium, yttrium and elements of the lanthanide series.

29. A composite material according to claim 28 wherein the rare earth metal oxide is yttrium oxide.

30. A composite material according to claim 27 wherein the oxide is an oxide of an element of the Groups IA, IIA, IIIA, and IVA of the periodic table.

31. A composite material according to claim 27 wherein the other oxide is selected from Al2O3, SiO2, MgO, CaO, BaO and SrO.

32. A composite material according to claim 27 wherein the secondary phase contains a mixture of oxides.

33. A composite material according to claim 27 wherein the boron suboxide is particulate or granular boron suboxide.

34. A composite material according to claim 27 wherein the mean grain size of the boron suboxide particles or granules range from 100 nm to 100 μm.

35. A composite material according to claim 34 wherein the mean grain size of the boron suboxide particles or granules range from 100 nm to 10 μm.

36. A composite material according to claim 27 wherein the fracture toughness of the composite material is greater than 3.5 MPa·m0.5.

37. A composite material according to claim 27 wherein the hardness of the composite material is greater than 25 GPa.

* * * * *